Feb. 3, 1953
G. HLATKO ET AL
2,627,405
RESILIENT RETRACTABLE LOAD CARRYING ASSEMBLY
Filed June 9, 1949
2 SHEETS—SHEET 1
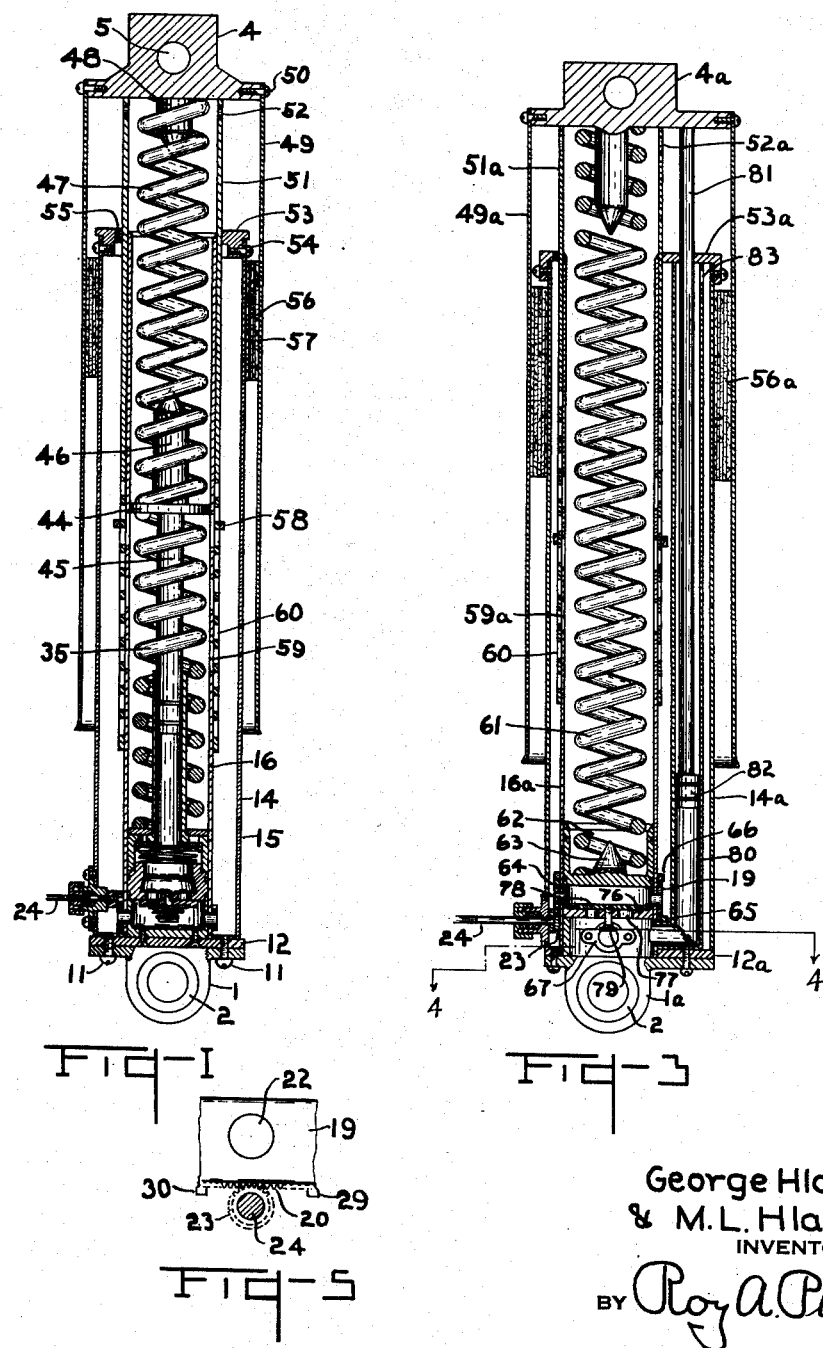
George Hlatko
& M. L. Hlatko
INVENTORS
BY Roy A. Plant
ATTORNEY Feb. 3, 1953  G. HLATKO ET AL  2,627,405
RESILIENT RETRACTABLE LOAD CARRYING ASSEMBLY
Filed June 9, 1949  2 SHEETS—SHEET 2
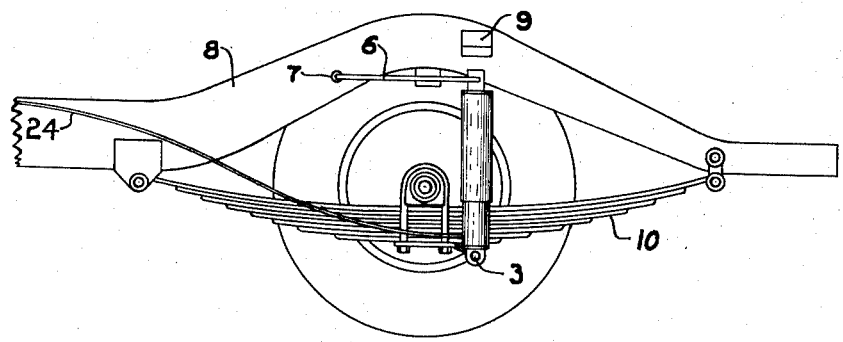
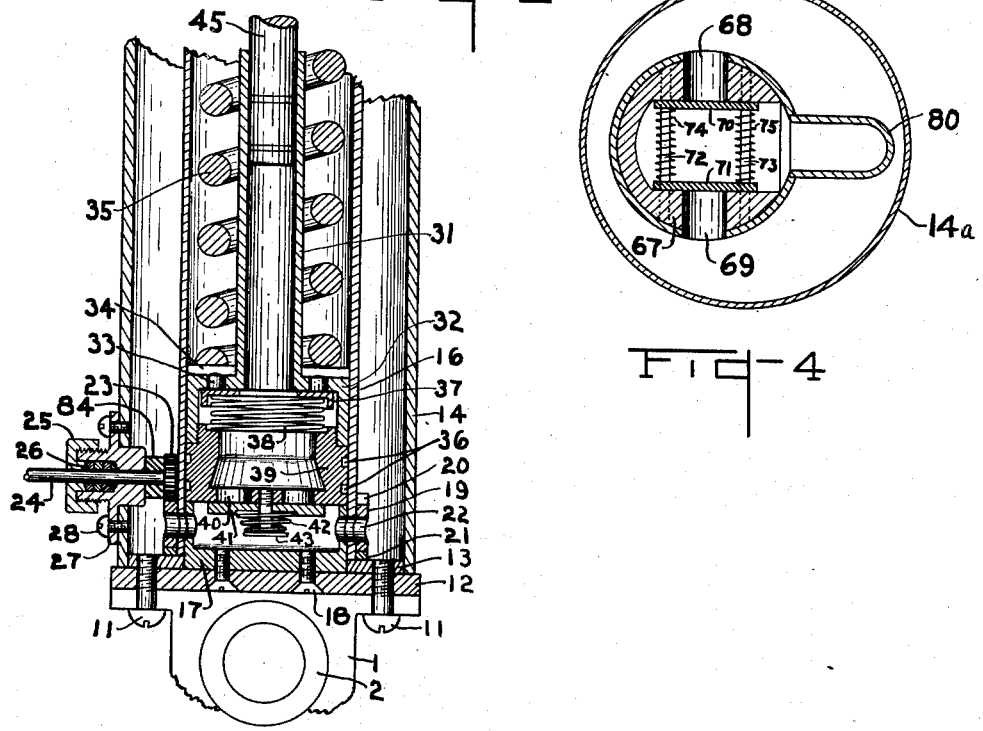
George Hlatko
& M. L. Hlatko
INVENTORS
BY Roy A. Plant
ATTORNEY Patented Feb. 3, 1953

2,627,405

UNITED STATES PATENT OFFICE 2,627,405

RESILIENT RETRACTABLE LOAD CARRYING ASSEMBLY

George Hlatko and Marshall L. Hlatko, Battle Creek, Mich.

Application June 9, 1949, Serial No. 98,042

18 Claims. (Cl. 267—60)

The present invention relates broadly to devices for supplementing the load carrying capacity of resilient members, such as the springs on an automotive vehicle, and in its specific phases to a hydraulically actuated spring cushioned assembly adapted to be elongated for supplementing the vehicle springs when added load carrying capacity is desired.

When automobiles are used to haul trailers, or pick-up trucks are loaded, the rear springs flatten out and the vehicle substantially "rides on the axle" if springs of a stiffness suitable for comfortable riding under light loads are used. To overcome this, it has been the standard practice to either add extra leaves to the rear springs, or to place short rubber or coil spring bumpers on the axle or frame to help carry the load after the vehicle springs have flattened out. Neither of these procedures are wholly satisfactory in view of the hard riding qualities imparted to the vehicle by heavy springs under light loads, and the jolts when the bumper members take hold under heavy loads and rough roads. It was a recognition of this problem, and the lack of an adequate solution for same, which lead to the conception and development of the present invention.

Accordingly, among the objects of the present invention is the provision of a special form of spring assembly which may be brought into action for supplementing the normal load carrying springs of an automotive vehicle or the like.

Another object is to provide an apparatus adapted, when extended, to continuously supplement normal resilient load carrying members, and yet when retracted, it can act as a bumper assembly.

Another object is to provide a resilient supplemental load carrying assembly for automotive vehicles, wherein such assembly has hydraulic means for extending same into normal load carrying position.

Another object is to provide a hydraulically actuated supplemental resilient spring load carrying assembly having an inbuilt pump which is actuated by telescoping movement of the assembly due to motion of the axle relative to the frame of the vehicle when traveling under loaded conditions.

Another object is to provide a hydraulically extendable resilient spring supplementing assembly having a pump, and wherein that pump is only actuated when the load on the vehicle carrying same is such that the load supplementing assembly is caused to telescope so as to repeatedly shorten and lengthen at least to a limited extent.

Another object is to provide a supplemental load carrying assembly for automotive vehicles or the like, wherein such assembly has a rotary sleeve valve for controlling the operation of the assembly, and that sleeve valve in turn is provided with a remote control which may be mounted at any convenient point such as on the dashboard of the vehicle.

A further object is to provide a supplemental load carrying assembly which is of telescopable construction carrying an elevatable platform piston with a compression spring means mounted thereon.

A further object is to provide a telescopable supplemental load carrying assembly which is normally mounted in upright position with the bottom of same on a pivot and the top of same guided in its movement relative to a fixed location load transmitting member.

A further object is to provide the telescoping supplemental load carrying assembly with a dust filter to facilitate breathing action without dust contamination of the working parts of same, such assembly also having stop members which prevent it from accidentally coming apart under operating conditions.

Still further objects and advantages of the present invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of the various ways in which the principle of the invention may be used.

In the annexed drawings:

Figure 1 shows a longitudinal center section of a preferred form of the present invention.

Figure 2 shows an enlarged fragmentary longitudinal view of the lower portion of the Figure 1 assembly.

Figure 3 shows a longitudinal center section of a modified form of the assembly shown in Figure 1.

Figure 4 shows a sectional view taken substantially at line 4—4 of Figure 3 looking in the direction of the arrows.

Figure 5 shows a fragmentary view of the sleeve valve of Figure 3, and the rack and gear means for rotating same.

Figure 6 shows a preferred way of mounting one of the supplemental load carrying assemblies of the present invention.

Referring more particularly to Figures 1 and 2 of the drawings, it will be noted that the assembly is of telescoping construction. The bottom of this assembly is supplied with a head or bracket 1 which is provided with a sleeve bearing 2 adapted to be mounted on support member 3, Figure 6, for limited pivotal motion on same. This sleeve bearing may be mounted on a rubber cushion for quietness and shock cushioning, if desired, and it is intended that the drawing be considered as diagrammatically illustrating this as well as an ordinary bearing. The upper end of the assembly is provided with a head or cap member 4, which has a cross drilled opening 5 adapted to pivotally engage a guide rod 6, Figure 6, which in turn is mounted on a pivot member 7 carried by the vehicle frame 8. An angle bracket 9 is mounted on frame 8 and in position to engage cap member 4 of the assembly under conditions of operation. In this connection, it will be noted that when the vehicle is mounted so that spring 10 straightens out, cap member 4 of the assembly will engage the under face of angle bracket 9 for load carrying purposes as will be hereinafter described in detail.

As shown in Figure 2, bracket 1 is drilled for screws 11 which pass through aligning perforations in end plate 12 and into threaded engagement with annular ring 13 which is preferably threadably joined in fluid tight manner to the outer cylinder 14 of the bottom subassembly 15. Mounted on the upper edge of annular ring 13, is inner cylinder 16 of the lower subassembly. A cup shaped member 17 is adapted to fit the inner diameter of annular ring 13 and inner cylinder 16, said cup shaped member opening upward and being anchored to end plate 12 by means of screws 18. Rotary sleeve valve 19, which is preferably supplied with rack teeth 20 on its upper edge, is made of a size to closely but rotatably fit the outer diameter of inner cylinder 16 adjacent its lower end, and be spaced from annular ring 13 by means of a thrust bearing 21. Inner cylinder 16, cup shaped member 17, and rotary sleeve valve 19, are also provided with a multiplicity of aligned perforations 22 for a purpose to be hereinafter described.

In order to rotate rotary sleeve valve 19, a gear 23 is adapted to mesh with rack teeth 20 on said valve, and that gear in turn is mounted on a shaft 24 which passes through a space washer 84 and a gland assembly 25 provided with packing 26 in conventional manner. This gland assembly has a flange 27 which is suitably perforated for the reception of screws 28 which threadably engage suitable openings in outer cylinder 14. Fluid tight packing (not shown) will be conventionally used between flange 27 and outer cylinder 14. With the perforations 22 in alignment as shown in Figure 2, the lower assembly is in position to have free fluid flow between the interior of cup shaped member 17 and the space between outer and inner cylinders 14 and 16. The rotation of sleeve valve 19, due to actuation of gear 23, will shift the perforations 22 out of alignment and prevent free fluid flow, all for a purpose to be hereinafter described. In order to make it possible to align the perforations 22, a stop member 29, Figure 5, is provided on rotary sleeve 19 so as to prevent the turning of gear 23 from moving sleeve valve 19 past the alignment position. At the same time it is also desirable to be able to stop sleeve valve 19, when it has been moved so that the perforations are completely out of alignment and free flow stopped. To accomplish this a second stop 30 is provided on the rotary sleeve valve 19. The showing of these stops is to be considered as diagrammatic of the various equivalent ways in which the movement of the sleeve valve may be limited.

Mounted within the inner cylinder 16, Figure 2, is a valved piston assembly, the upper half of which has an axially extending tubular member 31 having an outwardly flared portion 32 which slidably fits the inner diameter of cylinder 16. The upper face of this outwardly flared portion 32, is provided with a plurality of inlet openings 33 which preferably terminate at their upper ends in the hollows of the corrugated upper face 34 of the outwardly flared portion 32. These corrugations prevent lower compression spring 35 from blocking off inlet openings 33. Threadably engaging the lower end of the downwardly extending flange of the outwardly flared upper portion of the piston, is the lower or outlet portion 39 of the piston with such portion also slidably fitting the inner diameter of inner cylinder 16. Oil rings 36, or the like, may be utilized for providing better sealing of the piston on inner cylinder 16. Mounted within the piston is an inlet valve 37, the center of which is open for communication to tubular member 31 of the piston assembly. A mild compression spring 38 is used to normally hold inlet valve 37 in position to close inlet openings 33. At the lower end of the outlet portion 39 of the piston are outlet openings 40, which are normally closed by an outlet valve 41 which is held in place on the under face of the outlet portion 39 of the piston assembly by means of a mild compression spring 42 supported on the lower portion 39 of the piston by means of a large headed screw 43.

Resting on the upper end of lower compression spring 35 is the perforated flange 44 of the downwardly extending rod 45 which passes into the upper end of tubular member 31 and acts as a piston therein. On the upper face of perforated flange 44, is a centering member 46 for upper compression spring 47 which also bears against the lower face of cap member 4 and is held in desired position by means of a centering member 48.

Extending downward from cap member 4, Figure 1, is an outer cylinder 49 which may be conventionally held on the cap member by means of threads and anchored by suitable screws 50. Inner cylinder 51 is fixedly anchored in centered position on the under face of cap member 4 by brazing, welding, or the like. Perforations 52 are preferably provided in the upper end of inner cylinder 51 to facilitate breathing of the assembly under conditions of the operation. Inner cylinder 51 is made with a close sliding fit on the outer face of inner cylinder 16. This inner cylinder 51 is also provided with multiple perforations 60 starting at its lowermost end and extending upward a distance of approximately ⅓ to ½ the length of same. Inner cylinder 16, starting approximately at the upper end of tubular member 31 when the latter is in its lowermost position, is provided with a multiplicity of slots 59 which extend up approximately to the location of perforated flange member 44. This provides free normal access for fluid flow from the space within inner cylinder 16 to the space between outer cylinder 14 and inner cylinder 16 for purposes to be hereinafter described.

At the upper end of outer cylinder 14 is mounted a ring member 53 by means of screws 54 or the like. This ring member slidably fits inner cylinder 51 and is provided with suitable perforations 55 for breathing purposes. Mounted at the upper end of outer cylinder 14, in the space between it and outer cylinder 49, is a highly porous filter member 56 which may be anchored to the outer face of outer cylinder 14 by adhesive means, pins 57, or the like. This filter keeps dust from getting into the inner moving parts of the assembly. Stop members 58 may be placed on the outer face of inner cylinder 51 to prevent accidental separation of the upper subassembly from the lower subassembly of the apparatus.

The operation of the apparatus shown in Figure 1 is as follows:

With the assembly mounted as shown in Figure 6, and filled approximately half full of a hydraulic fluid, such as oil, and wherein the piston is at its lowermost position and passageways 22 aligned, as shown in Figure 1, the whole assembly then merely acts as a bumper under various load conditions. However, if a heavy load is applied to the vehicle, such that spring 10 will flatten out and cause cap member 4 of the assembly to come up against the under face of angle bracket 9, then by rotating shaft 24 to move rotary sleeve valve 19 until perforations 22 are completely out of alignment and closed, any operation of the vehicle which will cause the springs to move up and down in conventional manner, will cause downwardly extending rod 45 to move up and down in tubular member 31 and act as a pump. In other words, when spring 10 flattens, rod 45 will move downward in tubular member 31 and force oil out of same through outlet openings 40, past outlet valve 41, and into the inner space of cup shaped member 17. Since this oil is pocketed, due to the rotary sleeve valve having been turned to closed position, the so pumped oil acts to elevate the piston a small amount. Upon return movement of rod 45 in upward direction in tubular member 31, this will create suction within the piston and that in turn will draw oil from within inner cylinder member 16, down through inlet openings 33, past inlet valve 37, which will close due to the action of mild compression spring 38, the moment rod 45 ceases to move upward in tubular member 31. The next downward movement of rod 45 in tubular member 31 repeats the former cycle and drives further oil into the hollow space above cup shaped member 17, which again elevates the piston a small amount. The continuing of this pumping action rapidly elevates the piston and compresses upper compression spring 47 and lower compression spring 35 so as to increase the load carrying capacity of spring 10. This elevating action continues until the lowermost end of the piston assembly reaches the bottom of the slots 59 in inner cylinder 16 whereupon further pumping will merely cause short circuiting of oil flow out through slots 59 and perforations 60, into the space between inner cylinder 16 and outer cylinder 14. This elevation of the piston, however, will have considerably compressed springs 35 and 47 so as to supplement the load carrying capacity of spring 10.

A modified form of the construction shown in Figure 1, is illustrated in Figure 3, wherein a single compression spring 61 extends from upper cap member 4a to piston 62, having a spring centering member 63, with such piston being moveable lengthwise of inner cylinder 16a.

An annular spacer ring 64, Figure 3, is placed inside of inner cylinder 16a and fastened thereto in conventional manner, while on the outer face of inner cylinder 16a and in alignment with ring 64 is mounted a rotary sleeve valve 19 which is in inverted position relative to that shown in Figure 1. The bottom edge of this sleeve valve is supported on a stop member 65 and on gear 23. This rotary sleeve valve 19 is also prevented from moving upward by means of an upper stop member 66.

Within the lower end of inner cylinder 16a, is an inlet valve assembly 67, Figures 3 and 4, which has a pair of opposite inlet passageways 68 and 69 covered by inlet valve plates 70 and 71 slidably mounted on rods 72 and 73, and normally held in closed position by means of mild compression springs 74 and 75. Within inner cylinder 16a and directly above inlet valve assembly 67 is mounted an outlet valve assembly 76 which is provided with perforations 77 covered by an outlet valve plate 78 which carries a headed screw type guide member 79.

Outer cylinder 14a, Figure 3, is offset sidewise from inner cylinder 16a and in the enlarged space between same is mounted a pumping cylinder 80, the lower end of which connects with the inside of the inlet valve assembly 67. The upper end of pumping cylinder 80 is anchored in conventional manner to an offset center ring member 53a. A piston rod 81, which is anchored at its upper end to cap member 4a, extends down through ring member 53a and thence down cylinder 80 to a point near its bottom when the assembly is in contracted position. The lower end of piston rod 81 carries a piston 82 for pumping a hydraulic fluid, such as oil, under conditions of use of the assembly. This oil, as has been previously described, should extend up the inside of the assembly approximately ⅓ to ½ of its contracted height.

Outer and inner cylinders 49a and 51a will also be mounted in offset position as shown in Figure 3, to take care of the external pumping cylinder, and the whole assembly will be fitted as before with a filter member 56a conventionally held in place. Pumping cylinder 80 will also be provided with a breathing opening 83, while inner cylinder 51a will be provided with breathing openings 52a.

The operation of the Figure 3 assembly is as follows:

With the inlet valve plates 70 and 71 closed as shown in Figure 4, and sleeve valve 19 closed, downward movement of piston 82 will force the hydraulic fluid under same through outlet perforations 77 and past outlet valve plate 78 into the space under piston 62 to correspondingly elevate same. Return movement of piston 82 will draw hydraulic fluid from the space between outer and inner cylinders 14a and 16a through inlet passageways 68 and 69 past inlet valve plates 70 and 71 and up into pump cylinder 80. The next downward movement of piston 82 then forces this fluid into the space under piston 62 as previously described. The continuing pumping action thus gradually elevates piston 62 and compresses spring 61 after cap member 4a has come into contact with angle bracket 9 on vehicle frame 8. This compressing continues until piston 62 rises to the point where its under edge reaches slot 59a whereupon further pumping forces the additional hydraulic fluid from under piston 62 out through slots 59a into the space between inner and outer cylinders 16a and 14a. Under these conditions, compression spring 61 will strongly supplement spring 10 of the vehicle, and permit a considerably heavier load to be carried without "riding the axle." When a light load is to be carried, valve 19 is rotated to open position which permits flow of hydraulic fluid from under piston 62 into the space between inner and outer cylinders 16a and 14a with resultant retraction of the assembly to a position where it merely acts as a bumper.

Other modes of applying the principle of our invention may be employed instead of those explained, change being made as regards the mechanism herein disclosed, provided the means stated by any of the following claims or the equivalent of such stated means be employed.

We therefore particularly point out and distinctly claim as our invention:

1. A resilient retractable load carrying assembly, which comprises a lower cylinder assembly, an upper cylinder assembly, at least one cylinder of each of said assemblies telescopically fitting each other, a compression spring means within said assemblies and of a length fitting same when they are in free retracted position, a piston within the cylinder of the lower assembly, said spring means being carried by said piston, and including controllable means at the lower end of said lower cylinder and below said piston to elevate said piston and extend said load carrying assembly.

2. A resilient retractable load carrying assembly, which comprises a lower cylinder means, and an upper cylinder means, said lower cylinder means having inner and outer cylinders with a fluid space between them, a cylinder of said upper cylinder means telescopically fitting the outer face of one of said cylinders of said lower cylinder means, a compression spring means within the inner cylinder of said lower cylinder means, said spring being of a length fitting said upper and lower cylinder means when they are in free retracted position, a piston within the inner cylinder of said lower cylinder means, said spring being carried by said piston, and including controllable means at the lower end of said lower cylinder and below said piston to elevate said piston and extend said load carrying assembly.

3. In a resilient retractable load carrying assembly which has upper and lower telescoping cylinders with a head on the upper end of the upper cylinder and a head on the lower end of the lower cylinder, the combination which comprises a floating piston in said lower cylinder, a compression spring means supported by said floating piston and carrying said upper cylinder, said spring means being of a length fitting said upper and lower telescoping cylinders when they are in free retracted position with the piston at its lowermost position, and including controllable means at the lower end of said lower cylinder and below said piston for elevating said piston in predetermined amount.

4. In a resilient retractable load carrying assembly which has upper and lower telescoping cylinders with a head on the upper end of the upper cylinder and a head on the lower end of the lower cylinder, the combination which comprises a floating piston in said lower cylinder, a compression spring means supported by said floating piston and extending substantially to the upper end of the upper cylinder, said spring means being of a length fitting said upper and lower telescoping cylinders when they are in free retracted position with the piston at its lowermost position, and pump and valve means including controllable means at the lower end of said lower cylinder and below said piston for elevating said piston in predetermined amount.

5. In a resilient retractable load carrying assembly which has upper and lower telescoping cylinders with a head on the upper end of the upper cylinder and a head on the lower end of the lower cylinder, the combination which comprises a floating piston in said lower cylinder, a compression spring means supported by said floating piston and extending substantially to the upper end of the upper cylinder, said spring means being of a length fitting said upper and lower telescoping cylinders when they are in free retracted position with the piston at its lowermost position, pump and valve means in the lower end of the lower cylinder below said piston for elevating said piston in predetermined amount, and means for controlling the operation of said valve.

6. In a resilient retractable load carrying assembly which has an upper means with inner and outer cylinders, a lower means with inner and outer cylinders, said upper means having a head on its upper end, said lower means having a head on its lower end, the inner cylinder of said upper means telescopically fitting the outer face of the inner cylinder of the lower means and the outer cylinder of the lower means fitting within the outer cylinder of the upper means, the combination which comprises a floating piston in said inner cylinder of the lower means, a compression spring means supported on said floating piston and carrying said upper means, said spring means being of a length fitting said upper and lower telescoping cylinders when they are in free retracted position with the piston at its lowermost position, and means in the lower end of the inner cylinder of the lower cylinder means for elevating said piston in predetermined amount.

7. In a resilient retractable load carrying assembly, which has an upper means with inner and outer cylinders, a lower means with inner and outer cylinders, said upper means having a head on its upper end, said lower means having a head on its lower end, the inner cylinder of said upper means telescopically fitting the outer face of the inner cylinder of the lower means and the outer cylinder of the lower means fitting within the outer cylinder of the upper means, the combination which comprises a floating piston in said inner cylinder of the lower means, a compression spring means supported on said floating piston and carrying said upper means, said spring means being of a length fitting said upper and lower telescoping cylinders when they are in free retracted position with the piston at its lowermost position, and means for elevating said piston in predetermined amount, including a fluid pump and a valve means working in the lower end of the inner cylinder of the lower cylinder means below said piston.

8. In a resilient retractable load carrying assembly, which has an upper means with inner and outer cylinders, a lower means with inner and outer cylinders, said upper means having a head on its upper end, said lower means having a head on its lower end, the inner cylinder of said upper means telescopically fitting the outer face of the inner cylinder of the lower means and the outer cylinder of the lower means fitting within the outer cylinder of the upper means, the combination which comprises a floating piston in said inner cylinder of the lower means, a compression spring means supported on said floating piston and carrying said upper means, said spring means being of a length fitting said upper and lower telescoping cylinders when they are in free retracted position with the piston at its lowermost position, means for elevating said piston in predetermined amount, including a fluid pump and a valve means working in the lower end of the inner cylinder of the lower cylinder means below said piston, and exteriorly operated means for controlling the operation of said valve.

9. In a resilient retractable load carrying assembly, as set forth in claim 4, wherein said valve is of rotary sleeve type and exteriorly operated means connected to said valve for rotating same between open and closed positions.

10. In a resilient retractable load carrying assembly, as set forth in claim 7, wherein said valve is of rotary sleeve type and exteriorly operated means connected to said valve for rotating same between open and closed positions.

11. A resilient retractable load carrying assembly, which comprises an upper means with inner and outer cylinders, a lower means with inner and outer cylinders, said upper means having a head on its upper end, said lower means having a head on its lower end, the inner cylinder of said upper means telescopically fitting the outer face of the inner cylinder of the lower means, and the outer cylinder of the lower means fitting within the outer cylinder of the upper means, means on the upper end of the outer cylinder of the lower means for guiding same in its endwise movement, said means on the upper end of said outer cylinder slidably fitting the outer face of the inner cylinder of the upper means, a floating piston in the inner cylinder of the lower means, a compression spring means supported on said floating piston and carrying said upper means, said spring means being of a length fitting said upper and lower inner telescoping cylinders when they are in free retracted position with the piston at its lowermost position, and including controllable means at the lower end of said inner cylinder of the lower cylinder means and below said piston for elevating said piston in predetermined amount.

12. A resilient retractable load carrying assembly, which comprises an upper means with inner and outer cylinders, a lower means with inner and outer cylinders, said upper means having a head on its upper end, said lower means having a head on its lower end, the inner cylinder of said upper means telescopically fitting the outer face of the inner cylinder of the lower means, and the outer cylinder of the lower means fitting within the outer cylinder of the upper means, means on the upper end of the outer cylinder of the lower means for guiding same in its endwise movement, said means on the upper end of said outer cylinder slidably fitting the outer face of the inner cylinder of the upper means, a floating piston in the inner cylinder of the lower means, a compression spring means supported on said floating piston and carrying said upper means, said spring means being of a length fitting said upper and lower inner telescopic cylinders when they are in free retracted position with the piston at its lowermost position, and means for elevating said piston in predetermined amount, including a fluid pump and valve means working in the lower end of the inner cylinder of the lower cylinder means below said piston.

13. A resilient retractable load carrying assembly, which comprises an upper means with inner and outer cylinders, a lower means with inner and outer cylinders, said upper means having a head on its upper end, said lower means having a head on its lower end, the inner cylinder of said upper means telescopically fitting the outer face of the inner cylinder of the lower means, and the outer cylinder of the lower means fitting within the outer cylinder of the upper means, means on the upper end of the outer cylinder of the lower means for guiding same in its endwise movement, said means on the upper end of said outer cylinder slidably fitting the outer face of the inner cylinder of the upper means, a floating piston in the lower means, a compression spring means supported on said floating piston and carrying said upper means, said spring means being of a length fitting said upper and lower inner telescoping cylinders when they are in free retracted position with the piston at its lowermost position, means for elevating said piston in predetermined amount, including a fluid pump and valve means working in the lower end of the inner cylinder of the lower cylinder means below said piston, and exteriorly operated means for controlling the operation of said valve.

14. In a resilient retractable load carrying assembly, as set forth in claim 13, wherein said valve is of rotary sleeve type, and wherein said means for controlling the operation of said valve includes a rack on the valve, a gear meshing with said rack and a shaft carrying the gear and extending outwardly of the lower cylinder means.

15. A resilient retractable load carrying assembly, which comprises a lower cylinder means, an upper cylinder means, at least one cylinder of each of said means telescopically fitting each other, a compression spring means within said telescoping cylinders and of a length fitting same when they are in free retracted position, a piston fitting the cylinder, said piston having an inlet valve in its upper end and an outlet valve in its lower end, a fluid pump connected to the interior of said piston, said spring means being carried by said piston, said piston carrying cylinder having an outlet from its lower end, valve means for opening and closing said outlet, and means for controlling said valve.

16. The combination with an automotive vehicle having a frame and axle, said axle carrying a spring on which said frame is mounted, of a resilient retractable load carrying assembly, means for pivotally mounting the lower end of said assembly in fixed position on said axle, arm means pivotally fastened at one end on said frame, means for pivotally joining the other end of said arm means to the upper end of said load carrying assembly, stop means on said frame for engaging the upper end of said load carrying assembly when said vehicle is loaded, compression spring means carried by a floating piston within said load carrying assembly, and including controllable means within said load carrying assembly and below said piston for elevating said piston, and through the compression spring means carried thereby, bringing the upper end of said load carrying assembly into firm contact with said stop means, whereby said compression spring means within said load carrying assembly supplements the regular springs connecting said axle and frame and permits heavier loading of said vehicle.

17. A resilient retractable load carrying assembly, which comprises an upper assembly consisting of a head with inner and outer cylinders depending therefrom, a lower assembly consisting of a head with inner and outer cylinders mounted thereon, in fluid tight manner, the inner cylinder of said lower assembly closely fitting and telescoping within the inner cylinder of said upper assembly, the outer cylinder of said lower assembly fitting within and freely clearing the outer cylinder of said upper assembly, means on the upper end of said outer cylinder of said lower assembly adapted to contact and be guided lengthwise on the outer face of the inner cylinder of said upper assembly, filter means in the space between the outer cylinders of said upper and lower assemblies, a piston within the inner cylinder of said lower assembly, stop means within said piston carrying cylinder for supporting said piston a short distance above its lower end, said piston carrying cylinder having at least one passageway for communication between the space under said piston and the space between said inner and outer cylinders of said lower assembly, valve means located in said passageway for opening and closing said passageway, means for controlling the operation of said valve, said inner cylinder of said lower assembly having perforations through its sides starting at an elevation corresponding at their lower ends with the approximate maximum elevation to which the lower end of the piston would rise if fluid were pumped thereunder, said perforations extending above said piston when in its uppermost position, the lower portion of said inner cylinder of said upper assembly also being perforated to cooperate with the perforations in the inner cylinder of the lower assembly, said piston having an upwardly extending substantially coaxial open ended tubular member on its upper face, an inlet valve in the top of said piston for communication between the interior of said piston and the interior of said inner cylinder of the lower assembly, an outlet valve on the bottom of said piston for communication between the interior of said piston and the space beneath same, a rod with piston end fitting said open ended tubular member on the upper portion of said piston, a guide member on said rod well above the upper end of said open ended tubular member, said guide member being slidable on the inner face of the inner cylinder of said lower assembly, a compression spring extending down from said guide member to said piston fitting the inner bore of the inner cylinder of said lower assembly, and a second compression spring freely extending from the top of said guide member to the upper end of said inner cylinder of the upper assembly when the whole apparatus is in retracted position.

18. A resilient retractable load carrying assembly, which comprises an upper assembly consisting of a head with inner and outer cylinders depending therefrom, a lower assembly consisting of a head with inner and outer cylinders mounted thereon, in fluid tight manner, the inner cylinder of said lower assembly closely fitting and telescoping within the inner cylinder of said upper assembly, the outer cylinder of said lower assembly fitting within and freely clearing the outer cylinder of said upper assembly, said outer cylinders being substantially concentric and offset sidewise from said inner cylinders, means on the upper end of said outer cylinder of said lower assembly adapted to contact and be guided lengthwise on the outer face of the inner cylinder of said upper assembly, filter means in the space between the outer cylinders of said upper and lower assemblies, a piston within the inner cylinder of said lower assembly, stop means within said piston carrying cylinder for supporting said piston a short distance above its lower end, said piston carrying cylinder having at least one passageway for communication between the space under said piston and the space between said inner and outer cylinders of said lower assembly, valve means located in said passageway for opening and closing said passageway, means for controlling the operation of said valve, said inner cylinder of said lower assembly having perforations through its sides starting at an elevation corresponding at their lower ends with the approximate maximum elevation to which the lower end of the piston would rise if fluid were pumped thereunder, said perforations extending above said piston when in its uppermost position, the lower portion of said inner cylinder of said upper assembly also being perforated to cooperate with the perforations in the inner cylinder of the lower assembly, a compression spring freely extending from the top of said piston when in lowermost position to the head of said upper assembly when retracted, said inner cylinder having a partition adjacent its lower end but below said first named valve means, a check valve on said partition for pocketing fluid under said piston, inlet valve means in communication with the space in said inner cylinder below said partition and the space between said inner and outer cylinders of said lower assembly, a pumping cylinder connected to said space under said partition and extending upward between said inner and outer cylinders of said lower assembly, a piston within the lower portion of and fitting said pumping cylinder, and a piston rod connecting said piston to the head of said upper assembly.

GEORGE HLATKO.
MARSHALL L. HLATKO.

REFERENCES CITED

The following references are of record in the file of this patent:

UNITED STATES PATENTS

| Number | Name | Date |
|---|---|---|
| 2,150,576 | Bell | Mar. 14, 1939 |
| 2,348,160 | Thornhill | May 2, 1944 |
| 2,361,575 | Thompson | Oct. 31, 1944 |

FOREIGN PATENTS

| Number | Country | Date |
|---|---|---|
| 637,988 | France | May 12, 1943 |